Sept. 15, 1970 R. J. SCHWELLER ET AL 3,528,531

ADJUSTABLE ORIFICE SHOCK ABSORBER

Filed Nov. 21, 1968 2 Sheets-Sheet 1

INVENTORS.
Robert J. Schweller, &
Alan J. Watson

J. C. Evans
ATTORNEY

Sept. 15, 1970 R. J. SCHWELLER ET AL 3,528,531

ADJUSTABLE ORIFICE SHOCK ABSORBER

Filed Nov. 21, 1968 2 Sheets-Sheet 2

INVENTORS.
Robert J. Schweller, &
BY Alan J. Watson

J. C. Evans

ATTORNEY 3,528,531

ADJUSTABLE ORIFICE SHOCK ABSORBER

Robert J. Schweller and Alan J. Watson, Dayton, Ohio, assignors to General Motors Corporation, Detroit, Mich., a corporation of Delaware Filed Nov. 21, 1968, Ser. No. 777,697
Int. Cl. F16f 9/34
U.S. Cl. 188—88 3 Claims

ABSTRACT OF THE DISCLOSURE

In preferred form, a direct acting hydraulic shock absorber having an externally adjusted, variable orifice fluid bypass from a rebound chamber to a reservoir chamber to regulate fluid flow. The bypass includes a variably sized semi-circular segment defined by a groove in a piston rod guide and an adjacent rotatable orifice ring. A fluid passageway extends from the reservoir chamber through the piston rod guide to one end of the circular groove. A port in the orifice ring communicates the rebound chamber with the groove. When the shock absorber piston rod is in its extreme rebound position and turned, there is an indexed relative rotation between the orifice ring and the piston rod guide which moves the port along the grooved variable depth channel to change the degree of fluid restriction from the rebound chamber to the reservoir chamber to vary rebound dampening characteristics.

DISCLOSURE

This invention relates to a direct acting hydraulic shock absorber assembly for automobiles or the like having a variable orifice fluid bypass passageway between the rebound chamber and the reservoir chamber.

Different vehicle types can require different shock absorber dampening characteristics. For example, on paved highways an ordinary passenger vehicle requires shock absorber dampening that controls relatively low amplitude vehicle chassis movement produced by reduced dynamic shock loading. Sports vehicles often have shock absorbers with greater dampening to produce what is characterized as greater road feel.

To obtain both types of shock absorber operation, it would be desirable to include means in a shock absorber unit to permit an external adjustment of the shock absorber which would change its dampening rate.

One method for varying dampening in a shock absorber is to disassemble the unit to change the size of a fluid bypass from the rebound chamber to the reservoir chamber and the regulation of hydraulic fluid flow therethrough. Insertion of a relatively large orifice in the bypass permits free flow of fluid from the rebound chamber to the reservoir chamber. This causes the shock absorber to have less rebound dampening and thereby to be less responsive to bumps. This provides a softer ride in the associated automobile.

Insertion of a smaller size orifice retards fluid flow from the rebound chamber to the reservoir chamber in sufficient quantity to produce more dampening of chassis movement. Such changes makes the shock absorber more responsive in that it increases road feel.

Such an approach has the obvious disadvantage of disassembling the shock absorber and rebuilding it.

Accordingly, an object of the present invention is the provision of a novel variable orifice shock absorber whose dampening characteristics can be altered without disassembly of the shock absorber.

Another object of the present invention is to provide a novel hydraulic shock absorber whose dampening characteristics can be varied by external adjustment of existing shock absorber components.

In one embodiment these objects are attained in a shock absorber that utilizes a fluid bypass extending from the rebound chamber to the reservoir chamber. The bypass includes a somewhat semi-circular grooved channel on the underside of a stationary piston rod guide which decreases both in width and depth from one of its ends to its opposite end. A fluid passageway extends from the large end of the grooved channel through the piston rod guide to the reservoir chamber and a port extends from the rebound chamber through a rotatable orifice ring to an outlet which opens into the grooved channel.

The position of the port outlet with respect to the grooved channel is changed by rotation of the orifice ring with respect to the stationary piston rod guide. This alters the cross-sectional flow area through the grooved channel from the port to the fluid passageway and varies the resistance to fluid flow therethrough thus affecting shock absorber dampening characteristics. The orifice ring is externally adjusted by means of the shock absorber piston and piston rod. When the shock absorber piston rod is in its maximum extended position, the piston engages the orifice ring. Coacting means on the piston and ring connect for causing ring movement when the piston rod is manually rotated. Thus, a desirable feature of the present invention is a simple manual method of adjustment by which the responsiveness of the shock absorber may be varied by external adjustment of existing shock absorber parts.

A further desirable feature of the present invention is the inclusion of an indexing arrangement between the orifice ring and the piston rod guide for angularly positioning the orifice ring relative to the piston rod guide. This indexing arrangement includes an indexing ball which is supported within a shallow bore in the end face of the piston rod guide so as to expose a portion of the ball to interact with blind holes formed in an adjacent end surface of the orifice ring. Unequal circumferential spacing of the blind holes facilitates relative angular positioning of the orifice ring and the piston rod guide to produce desired dampening.

Further objects and advantages of the present invention will be apparent from the following description, reference being had to the accompanying drawings wherein a preferred embodiment of the present invention is clearly shown.

Figure 1:
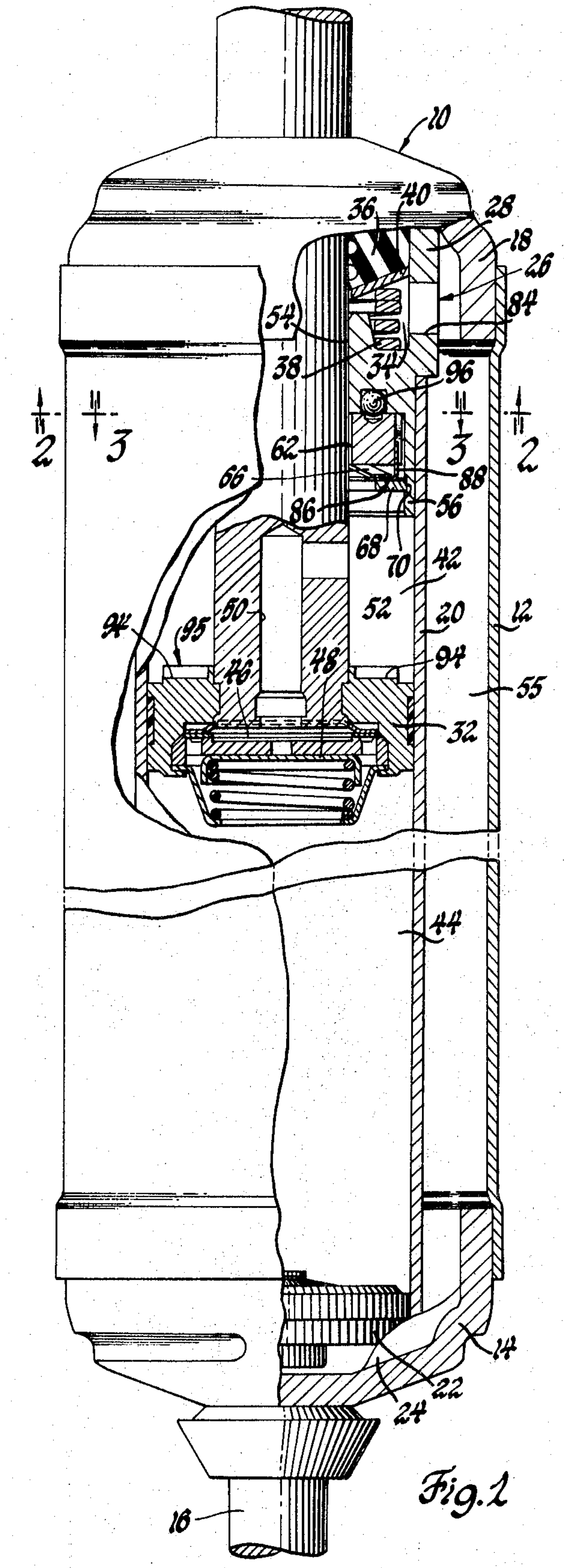
FIG. 1 is a front elevational view partially in vertical section of a shock absorber incorporating the features of this invention.

In FIG. 1 of the drawings, a shock absorber assembly 10 is illustrated. Assembly 10 includes an outer reservoir tube 12 which is attached at its lower end in a fluid tight manner to a circular cup-shaped bottom end cap 14. A fitting 16 (partially shown) attached to the exterior surface of the end cap 14 is adapted to secure the shock absorber assembly 10 to the unsprung mass of the vehicle.

The top end of the reservoir tube 12 is enclosed by an inverted cup-shaped end cap 18 having a fluid tight connection therewith. Located concentrically within the reservoir tube 12 is a smaller diameter pressure cylinder tube 20.

A base valve 22 is held within the bottom end of pressure cylinder tube 20 by a plurality of tabs 24 extending inwardly from the bottom end cap 14. An upright cup-shaped rod guide 26 closes the upper end of pressure cylinder tube 20. Upwardly extending sides 28 of the cup-shaped rod guide 26 are secured by the surrounding top end cap 18 to coaxially position the pressure cylinder tube 20 relative to reservoir tube 12. Rod guide 26 is axially held within the top end of tube 20 by the end cap 18.

Concentrically located within pressure cylinder tube 20 and extending through axial bores within rod guide 26 and end cap 18 is a cylindrically shaped reciprocal piston rod 30. A top end of the piston rod 30 which projects through end cap 18 is secured to a fitting (not shown) exteriorly of the shock absorber 10 adapted to secure the shock absorber to the sprung mass of a vehicle. A valved piston 32, which is coaxially supported within pressure cylinder tube 20, is attached to the lower end of piston rod 30 for relative reciprocal movement therewith. Relative movement between the sprung mass and the unsprung mass of a vehicle causes the piston rod 30 and attached piston 32 to reciprocate within the pressure cylinder tube 20.

Encircling the piston rod 30 and supported within a hollow interior 34 of cup-shaped rod guide 26 formed by the upstanding sides 28 is a piston rod seal 36 made from an elastic material such as rubber. Seal 36 is biased against end cap 18 by a seal spring 38 which bears at one end against rod guide 26 and bears at the other end against a seal washer 40 adjacent the lower end of seal 36. The seal 36 prevents leakage of hydraulic fluid from the shock absorber interior upon reciprocation of the piston rod 30 within pressure cylinder tube 20.

A variable volume rebound chamber 42 is formed within pressure cylinder tube 20 between rod guide 26 and the valved piston 32. A variable volume compression chamber 44 is formed within pressure cylinder tube 20 between base valve 22 and the valved piston 32. Both chamber 42 and chamber 44 are completely filled with hydraulic fluid during normal operation of the shock absorber. Movement of valved piston 32 within pressure cylinder tube 20 toward rod guide 26 necessarily decreases the volume of the rebound chamber 42. Likewise, movement of the valved piston 32 within pressure cylinder tube 20 toward base valve 22 decreases the volume of the compression chamber 44. Valving elements 46 and 48 mounted on the piston 32 regulate the flow of hydraulic fluid between chambers 42 and 44 caused by reciprocation of piston 32 within pressure cylinder tube 20. An axial bore 50 and a radial bore 52 through piston rod 30 fluidly communicate the rebound chamber 42 with the valving elements 46 and 48. The regulation of hydraulic flow through piston 32 produces a predetermined dampening of relative movement between sprung and unsprung masses of the associated vehicle.

The radial bore 52 is formed through the wall of piston rod 30 at an axial distance from piston 32 to cause a wall 54 of rod guide 26 to progressively cut off flow of hydraulic fluid through bores 50, 52 and valved piston 32 as the piston rod 30 is withdrawn from the shock absorber interior and approaches a predetermined maximum elongation. This cut-off arrangement which produces an accelerated rate of dampening as the shock absorber assembly 10 is elongated to a predetermined maximum length protects the assembly from shock damage. For a more detailed explanation of a valved piston of the type found in the preferred embodiment, reference is made to U.S. Pat. 3,187,847, issued June 8, 1965, it being understood that hte details of the valving form no part of the present invention and that the invention is equally suited for use with shock absorbers having other piston means.

Movement of piston rod 30 downward within pressure cylinder tube 20 causes a decrease in compression chamber volume greater than the increase in rebound chamber volume. Likewise, on reverse piston rod movement the increase in compression chamber volume is greater than the decrease in rebound chamber volume. The differential in each case equals the volume of the piston rod 30 either entering or exiting the rebound chamber 42. Because of this volumetric inequality, a supplementary quantity of hydraulic fluid must be provided to supply fluid to the compression chamber 44 upon movement of the piston 32 upward in pressure cylinder tube 20 and means must be provided to accept excess fluid from compression chamber 44 upon movement of piston 32 downward within pressure cylinder tube 20. A fluid containing reservoir chamber 55 located in the annular space between the reservoir tube 12 and the pressure cylinder tube 20 performs this fluid supply function.

The base valve 22 which is located between reservoir chamber 55 and compression chamber 44 regulates the flow of hydraulic fluid therebetween. Valving components (not shown) within base valve 22 permit hydraulic fluid from the reservoir chamber 55 to enter the compression chamber 44 upon movement of piston 32 away from base valve 22. Other valving components (not shown) within base valve 22 permit hydraulic fluid from the compression chamber 44 to flow into the reservoir chamber 55 upon movement of the piston 32 downward in pressure cylinder tube 20. For a more detailed explanation of the base valve 22, reference is made to U.S. Pat. 2,583,169, issued Jan. 22, 1952. The details of valve 22 as exemplified in this patent form no part of the present invention but are merely representative of one suitable valving arrangement for controlling hydraulic fluid flow between compression chamber 44 and reservoir chamber 32.

Since it is desirable to provide means in a shock absorber to vary its dampening characteristics, the present invention includes a variable orifice bypass between the rebound chamber and the reservoir chamber of the shock absorber which is manually and externally adjustable. Adjustment of the bypass changes its configuration so that the fluid flow resistance therethrough is varied. This varies the responsiveness of the shock absorber to bumps.

Figure 4:
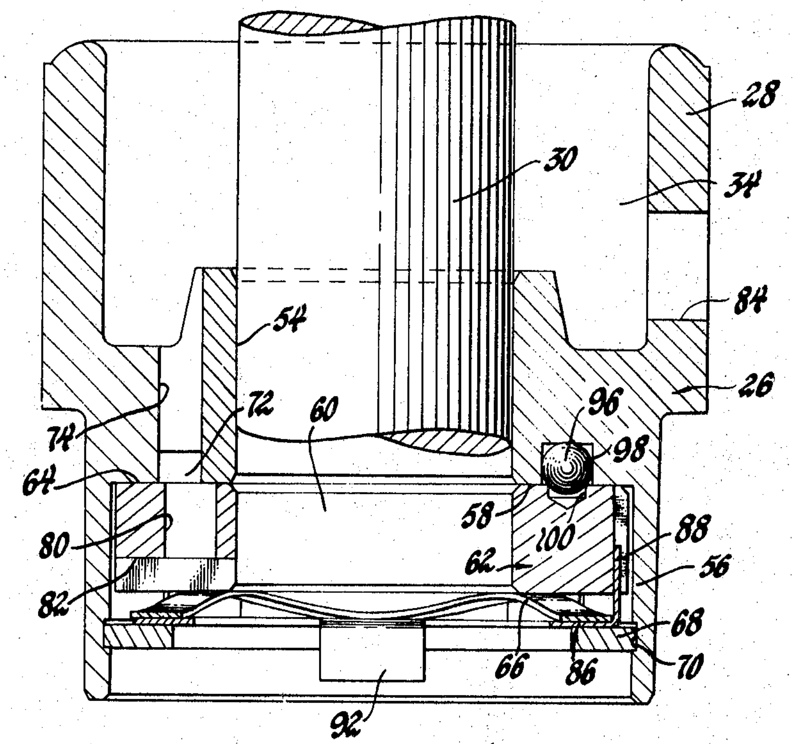
FIG. 4 is an enlarged vertical sectional view of a piston rod guide and orifice ring assembly in the invention.
Figure 5:
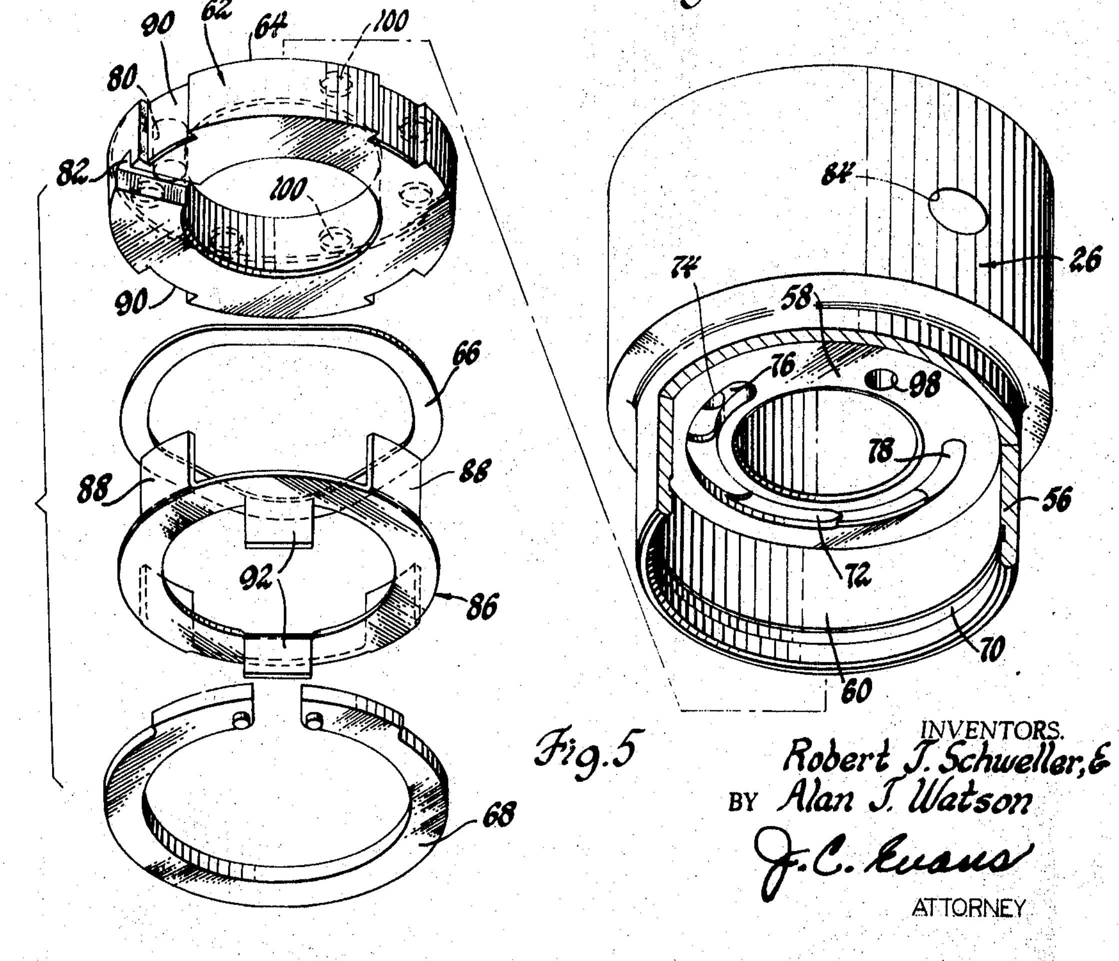
FIG. 5 is an exploded view of the piston rod guide and the orifice ring assembly partially broken away to reveal the grooved fluid channel formed on the interior face of the piston rod guide.

More particularly, the means defining the variable orifice bypass between the rebound chamber and the reservoir chamber can best be seen in FIGS. 4 and 5. The piston rod guide 26 has a downwardly extending circular flange 56 extending from an end face 58 to define an inverted cup-shaped space 60. An orifice ring 62 having an end surface 64 which is adjacent face 58 of rod guide 26 is supported within space 60. Orifice ring 62 is biased against the face 58 of piston rod 26 by a wave washer 66 interposed between the orifice ring 62 and an annular washer shaped snap ring 68. Snap ring 68 expands into an annular depression 70 circumferentially formed in flange 56 and within space 60.

The variable orifice bypass between the rebound chamber and the reservoir chamber is partially defined by a somewhat semi-circular grooved channel or orifice groove 72 formed within and extending partially around end face 58 of piston rod guide 26. An axially directed bore 74 through guide 26 communicates seal space 34 with one end 76 of the grooved channel 72. From the one end 76 of groove 72 to an opposite end 78 the groove decreases in depth and width to form a progressively greater restriction to fluid flow from end 76 to end 78.

Groove 72 is best seen in FIG. 5 as extending in a circular path and including a plurality of machined indentations varying in depth and in width. Thus, the cross-sectional flow area of the grooved channel 72 decreases from one end 76 to the other end 78 to form a progressively greater restriction to fluid flow from end 76 to end 78.

It should be noted that in the present embodiment of the invention the grooved channel 72 is formed by a plurality of machined identations within rod guide 26 which decrease in width and depth from end 76 to end 78. This method of varying the cross-sectional flow area is particularly convenient when channel 72 is formed by machining. However, channel 72 can also be molded as a continuously formed, variable depth groove within rod guide 26. Also, it is to be understood that channel 72 could just as easily be formed in the top surface 64 of orifice ring 62 rather than within end face 58 of the rod guide 26.

An axially directed bore 80 through the orifice ring 62 extends from its end surface 64 to a radial identation 82 in the lower face of orifice ring 62 to fluidly communicate the grooved channel 72 with the rebound chamber. Thus, a fluid bypass extends from rebound chamber 42 through the bore 80, along the grooved channel 72 between orifice ring 62 and the piston rod guide 26, through the bore 74 and into the seal space 34, through a radial bore 84 in the upstanding side 28 of the rod guide 26 and into the reservoir chamber 27.

The minimum cross-sectional flow area through the fluid bypass formed in part by grooved channel 72 may be varied by pivoting the orifice ring 62 with respect to piston rod guide 26 which moves bore 80 along the grooved channel 72 between its narrower and shallower end 78 and its wider and deeper end 76. When orifice ring 62 is positioned with respect to the piston rod guide 26 so that bores 74 and 80 are substantially aligned, minimal fluid resistance occurs thereacross. When bore 80 is positioned adjacent the smaller end 78 of orifice groove 72, hydraulic fluid must flow through the full length of grooved channel 72 from end 78 to end 76 which results in increased fluid resistance therethrough.

Figure 2:
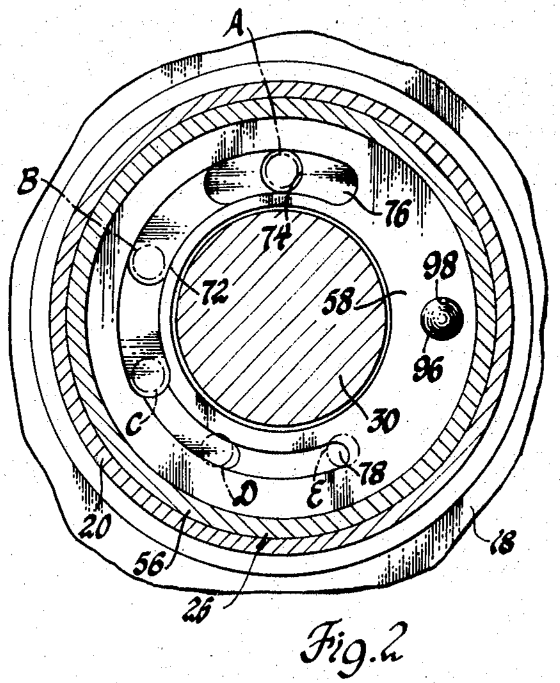
FIG. 2 is an enlarged horizontal sectional view taken along section line 2—2 of FIG. 1 looking in the direction of the arrows.
Figure 3:
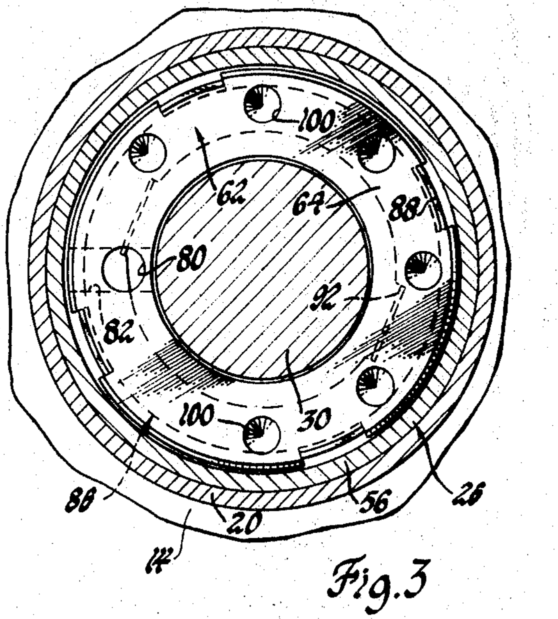
FIG. 3 is an enlarged horizontal sectional view taken along section line 3—3 of FIG. 1 looking in the direction of the arrows.

When bore 80 is positioned adjacent the larger end 76 of grooved channel 72, the flow area is relatively great and the fluid flow resistance therethrough is resultantly low thus providing a relatively unrestricted bypass around the valved piston 32, low response of the shock absorber to bumps. Correspondingly, when the bore 80 is positioned adjacent the smaller end 78 of grooved channel 72, the flow area is relatively small and the fluid flow resistance therethrough is resultantly high thus providing a relatively restricted bypass around the valved piston 32. Intermediate dampening is produced when bore 80 is positioned intermediate these positions. The plural control positions of bore 80 are shown in dotted outline on FIG. 2 and are referenced as points A through E. In a shock absorber with a cylinder tube of one inch diameter the following shows the rebound dampening obtained at each control position for a 1" and a 4" piston stroke at 400 cycles per minute and at 200 cycles per minute.

CONTROL SCHEDULE

| Point | Load (lb.) | |
|---|---|---|
| | 4" stroke and 400 cycles/min. | 4" stroke and 200 cycles/min. |
| A | 500 | 170 |
| B | 605 | 195 |
| C | 700 | 215 |
| D | 815 | 240 |
| E | 865 | 250 |
| | 1" stroke and 400 cycles/min. | 1" stroke and 200 cycles/min. |
| A | 95 | 75 |
| B | 110 | 90 |
| C | 123 | 92 |
| D | 136 | 100 |
| E | 136 | 100 |

As previously explained, the fluid flow area through channel 72 is altered by rotating orifice ring 62 with respect to rod guide 26 thus changing the relative positions between end 76 of channel 72 and bore 80. To obtain this movement a washer shaped drive plate 86 is interposed between wave washer 66 and snap ring 68. A plurality of tabs 88 extend upwardly from the outer edge of drive plate 86 to engage indentations 90 on the outer circumferential surface of orifice ring 62 thus interconnecting drive plate 86 and orifice ring 62 rotatably together. Drive plate 86 also has depending tabs 92 formed on its inner radial edge which extend through the inner diameter of the snap ring 68. Drive plate 86 is pivoted by interaction between two diametrically opposed grooves 94 formed in a raised annular portion 95 on the top end face of piston 32 and the depending tabs 92 on drive plate 86. Tabs 92 extend into grooves 94 when the shock absorber rod 30 is extended to its maximum elongated length. When in this position the piston rod 30 can be rotated by grasping it and turning it relative to tube 12. When tabs 92 project into into grooves 94, the orifice ring 62 can be rotated with respect to piston rod guide 26 to change the position of bore 80 with respect to end 76 of orifice groove 72 by rotating piston rod 30 relative to tube 12.

Another aspect of the invention is that it includes means to identify the multiple control positions (A–E) of orifice ring 62. More particularly, an indexing ball 96 is supported within an indentation 98 formed within the end face 58 of rod guide 26. The depth of identation 98 is limited to cause part of the index ball 96 to protrude beyond the end face 58 of rod guide 26. A plurality of shallow blind holes 100 upon the upper end face 64 of orifice ring 62 are adapted to receive the protruding portion of index ball 96 upon pivoting of the orifice ring 62 with respect to rod guide 26.

Movement of the index ball 96 into a blind hole 100 produces a definite restraint which can be felt as the piston rod 30 is rotated with respect to reservoir tube 12. In the present embodiment, the holes 100 are spaced circumferentially as an indication of the relative position of orifice ring 62 and rod guide 26. The indexing arrangement in the present embodiment also helps to identify various predetermined relative positions between ring 62 and guide 26. It should be noted that while the index ball 96 and the associated blind holes 100 are located within the end face 60 and the end surface 64, respectively, other positions would be satisfactory. For instance, the outer circumferential surface of orifice ring 62 and the inner side of the continuous flange 56 would be satisfactory for supporting the indexing arrangement.

When the orifice ring 62 is pivoted with respect to rod guide 26, the protruding portion of the index ball 96 moves orifice ring 62 axially downward against wave washer 66 until a blind hole 100 is aligned with the ball 96 whereupon wave washer 66 springs the orifice ring 62 axially upward against the interior face 60 of guide 26. The wave washer 66 also allows the drive plate 86 to move axially upward toward the orifice ring 62 when struck by the top end face of piston 32 without causing damage to the drive coupling between piston rod 30 and ring 26. Thus, wave washer 66 serves the dual function of axially biasing orifice ring 62 against guide 26 and of resiliently compensating relative axial movement between plate 86 and ring 26.

While the embodiment of the present invention as herein described constitutes a preferred form, it is to be understood that other forms may be adapted.

What is claimed is as follows:

1. A hydraulic direct acting shock absorber comprising: a cylindrical pressure cylinder tube; a valved piston concentrically supported within said pressure cylinder tube for the regulation of hydraulic fluid flow therethrough; a cylindrical reservoir tube concentrically surrounding said pressure cylinder tube and forming a hydraulic reservoir chamber therebetween; a piston rod attached to said piston for reciprocation in said pressure cylinder tube; said rod extending axially outward from said pressure cylinder tube; a piston rod guide within one end of the pressure cylinder tube for positioning said piston rod within said pressure cylinder tube; said piston rod guide having an end face lying in a plane substantially perpendicular to said piston rod; a fluid filled variable volume rebound chamber within said pressure cylinder tube between said piston and said piston rod guide; an orifice ring around said piston rod and adjacent said piston rod guide; said orifice ring having an end surface abutting said end face of said guide means; a semicircular groove in said end face of said piston rod guide; said semicircular groove extending from a first end portion to a second end portion concentrically around said piston rod; said groove being progressively restricted by a decrease in width and depth from said first end portion to said second end portion; a first passageway extending through said piston rod guide fluidly connecting said reservoir chamber with said first end portion of said groove; a second passageway extending through said orifice ring and fluidly connecting said rebound chamber with said groove; a washer shaped drive plate having upwardly extending tabs which operatively engage said orifice ring to cause rotative movement together; depending tabs on said drive plate extending toward said piston; means on the upper end of said piston for engaging said depending tabs to rotate said drive plate and orifice ring when said piston is rotated which moves said second passageway along said groove and with respect to said first passageway.

2. The shock absorber as set forth in claim 1, including a wave washer between said orifice ring and said drive plate; an annular snap ring engaging said piston rod guide to retain said drive plate, wave washer and orifice ring adjacent said piston rod guide.

3. The shock absorber as set forth in claim 1, including an index means for externally indicating the angular position of said orifice ring with respect to said piston rod guide; said index means including a plurality of blind holes in said end surface of said orifice ring; an index ball within an indentation in said end face of said piston rod guide; said index ball and said blind holes coacting together to position said second passageway in predetermined positions along said groove and with respect to said first passageway; said blind holes located in a circular path about said piston rod and having unequal circumferential spacing therebetween to indicate the position of said orifice ring by external rotation of said piston rod.

References Cited

UNITED STATES PATENTS 2,182,016 12/1939 Deutsch ------------- 188—88

GEORGE E. A. HALVOSA, Primary Examiner

U.S. Cl. X.R.

188—97, 100